US008959441B2

(12) United States Patent
Fermon

(10) Patent No.: US 8,959,441 B2
(45) Date of Patent: Feb. 17, 2015

(54) VARIABLY DISPLAYABLE MOBILE DEVICE KEYBOARD

(75) Inventor: Israel Fermon, Jerusalem (IL)

(73) Assignee: Yoram Ben-Meir, Givataim (IL)

( * ) Notice: Subject to any disclaimer, the term of this patent is extended or adjusted under 35 U.S.C. 154(b) by 1537 days.

(21) Appl. No.: 12/046,800

(22) Filed: Mar. 12, 2008

(65) Prior Publication Data

US 2008/0301575 A1    Dec. 4, 2008

Related U.S. Application Data

(63) Continuation-in-part of application No. PCT/IL2007/000819, filed on Jul. 2, 2007.

(30) Foreign Application Priority Data

Jul. 3, 2006 (IL) .......................................... 176673

(51) Int. Cl.
| | |
|---|---|
| *G06F 3/00* | (2006.01) |
| *G06F 3/0488* | (2013.01) |
| *G06F 1/16* | (2006.01) |
| *G06F 3/023* | (2006.01) |
| *G06F 3/041* | (2006.01) |

(52) U.S. Cl.
CPC .......... *G06F 3/04886* (2013.01); *G06F 1/1616* (2013.01); *G06F 1/1662* (2013.01); *G06F 1/1692* (2013.01); *G06F 3/0238* (2013.01); *G06F 3/0416* (2013.01); *G06F 2200/1614* (2013.01)
USPC ........... 715/761; 715/765; 715/767; 715/768; 715/773; 715/778; 715/798; 715/801

(58) Field of Classification Search
USPC ......... 715/773, 861, 761, 765, 767, 768, 778, 715/798, 801
See application file for complete search history.

(56) References Cited

U.S. PATENT DOCUMENTS

| | | | | |
|---|---|---|---|---|
| 3,727,527 A | * | 4/1973 | Borowski et al. | ............. 396/290 |
| 3,748,753 A | * | 7/1973 | Whitcomb et al. | ........... 434/179 |
| 3,901,578 A | * | 8/1975 | Hudson | ........................... 359/15 |
| 4,021,935 A | * | 5/1977 | Witt | ................................. 434/36 |
| 4,099,172 A | * | 7/1978 | Montanari et al. | .............. 345/31 |
| 4,111,534 A | * | 9/1978 | Cirkler et al. | ................... 349/68 |

(Continued)

FOREIGN PATENT DOCUMENTS

| | | |
|---|---|---|
| DE | 197 39 676 C1 | 1/1999 |
| EP | 0 651 544 A2 | 5/1995 |

(Continued)

OTHER PUBLICATIONS

Ask-Search-q=light+scattering+liquid+crystal&qsrc=0.*

(Continued)

*Primary Examiner* — Boris Pesin
*Assistant Examiner* — John Heffington
(74) *Attorney, Agent, or Firm* — Merchant & Gould P.C.

(57) ABSTRACT

A variably displayable mobile device keyboard includes a display for presenting two or more groups of basic images, such that a different keyboard display can be generated by each of these groups of basic images, a filter for filtering one or more groups of basic images so that a single group of basic images will be displayed; and a touch screen transparent to ambient light for selecting a key of the displayed single group of basic images.

11 Claims, 9 Drawing Sheets

(56) References Cited

U.S. PATENT DOCUMENTS

| | | | | |
|---|---|---|---|---|
| 4,264,147 A * | 4/1981 | Baur et al. | | 349/70 |
| 4,396,251 A * | 8/1983 | Mukoh et al. | | 349/165 |
| 4,547,043 A * | 10/1985 | Penz | | 349/81 |
| 4,656,466 A * | 4/1987 | Yoshida et al. | | 345/4 |
| 4,856,857 A * | 8/1989 | Takeuchi et al. | | 359/3 |
| 4,884,073 A * | 11/1989 | Souloumiac | | 341/31 |
| 4,899,137 A * | 2/1990 | Behrens et al. | | 345/168 |
| 5,040,888 A * | 8/1991 | Bonham | | 351/203 |
| 5,055,739 A * | 10/1991 | Thioulouse | | 313/507 |
| 5,076,673 A * | 12/1991 | Lynam et al. | | 359/271 |
| 5,101,296 A * | 3/1992 | Bell | | 359/486.02 |
| 5,173,724 A * | 12/1992 | Bonham et al. | | 351/203 |
| H1488 H * | 9/1995 | Campagnuolo et al. | | 342/45 |
| 5,506,703 A * | 4/1996 | Suzuki et al. | | 359/17 |
| 5,647,151 A * | 7/1997 | Fantone et al. | | 40/454 |
| 5,681,220 A * | 10/1997 | Bertram et al. | | 463/37 |
| 5,700,550 A * | 12/1997 | Uyama et al. | | 428/212 |
| 5,706,030 A * | 1/1998 | Ishigami et al. | | 345/168 |
| 5,764,391 A * | 6/1998 | Smith | | 359/34 |
| 5,821,881 A * | 10/1998 | Fischer et al. | | 341/22 |
| 5,847,690 A * | 12/1998 | Boie et al. | | 345/104 |
| 5,917,562 A * | 6/1999 | Woodgate et al. | | 349/15 |
| 5,934,450 A * | 8/1999 | Rynk et al. | | 200/308 |
| 6,011,580 A * | 1/2000 | Hattori et al. | | 348/57 |
| 6,014,164 A * | 1/2000 | Woodgate et al. | | 348/51 |
| 6,061,103 A * | 5/2000 | Okamura et al. | | 348/767 |
| 6,070,349 A * | 6/2000 | Fantone et al. | | 40/454 |
| 6,122,022 A * | 9/2000 | Hayakawa | | 349/32 |
| 6,140,987 A * | 10/2000 | Stein et al. | | 345/87 |
| 6,292,243 B1 * | 9/2001 | Shingu et al. | | 349/122 |
| 6,449,219 B1 * | 9/2002 | Hepp et al. | | 368/16 |
| 6,492,978 B1 * | 12/2002 | Selig et al. | | 345/173 |
| 6,507,358 B1 * | 1/2003 | Mori et al. | | 348/42 |
| 6,512,607 B1 * | 1/2003 | Windsor et al. | | 359/15 |
| 6,532,048 B1 * | 3/2003 | Matsui | | 349/96 |
| 6,587,100 B1 * | 7/2003 | Shirasaki | | 345/204 |
| 6,683,630 B1 * | 1/2004 | Shoff et al. | | 715/805 |
| 6,847,428 B1 * | 1/2005 | Sekiguchi et al. | | 349/139 |
| 6,850,227 B2 | 2/2005 | Takahashi et al. | | 345/169 |
| 6,909,115 B2 * | 6/2005 | Kokubo et al. | | 257/66 |
| 6,911,608 B2 * | 6/2005 | Levy | | 200/5 A |
| 6,919,935 B2 * | 7/2005 | Vu et al. | | 349/45 |
| 7,041,233 B2 * | 5/2006 | Kuntz et al. | | 252/299.01 |
| 7,110,157 B2 * | 9/2006 | Beteille et al. | | 359/265 |
| 7,110,796 B2 * | 9/2006 | Lee | | 455/566 |
| 7,126,498 B2 * | 10/2006 | Levy | | 341/22 |
| 7,193,614 B2 * | 3/2007 | Bullister | | 345/168 |
| 7,256,924 B2 * | 8/2007 | Guarr et al. | | 359/265 |
| 7,292,614 B2 * | 11/2007 | Cok et al. | | 372/43.01 |
| 7,310,125 B2 * | 12/2007 | Kim et al. | | 349/113 |
| 7,330,234 B2 * | 2/2008 | Murakami et al. | | 349/155 |
| 7,333,259 B2 * | 2/2008 | Hirano et al. | | 359/265 |
| 7,336,266 B2 * | 2/2008 | Hayward et al. | | 345/179 |
| 7,336,271 B2 * | 2/2008 | Ozeki et al. | | 345/204 |
| 7,391,055 B1 * | 6/2008 | Murakami et al. | | 257/72 |
| 7,391,861 B2 * | 6/2008 | Levy | | 379/368 |
| 7,417,697 B2 * | 8/2008 | Chan | | 349/114 |
| 7,429,751 B2 * | 9/2008 | Yamazaki et al. | | 257/59 |
| 7,443,459 B2 * | 10/2008 | Kawamura et al. | | 349/58 |
| 7,450,291 B2 * | 11/2008 | Guarr et al. | | 359/265 |
| 7,502,036 B2 * | 3/2009 | Kramer et al. | | 345/629 |
| 7,539,526 B2 * | 5/2009 | Pirila et al. | | 455/575.3 |
| 7,542,050 B2 * | 6/2009 | Kramer et al. | | 345/629 |
| 7,605,902 B2 * | 10/2009 | Hirakata et al. | | 349/155 |
| 7,616,834 B2 * | 11/2009 | Kramer et al. | | 382/276 |
| 7,625,632 B2 * | 12/2009 | Argoitia | | 428/402 |
| 7,649,669 B2 * | 1/2010 | Abe | | 359/273 |
| 7,663,797 B2 * | 2/2010 | Hirano et al. | | 359/265 |
| 7,696,514 B2 * | 4/2010 | Kokubo et al. | | 257/59 |
| 7,714,824 B2 * | 5/2010 | Roth | | 345/88 |
| 7,725,140 B2 * | 5/2010 | Kang et al. | | 455/575.1 |
| 7,791,562 B2 * | 9/2010 | Mueller et al. | | 345/55 |
| 7,791,784 B2 * | 9/2010 | Giron et al. | | 359/265 |
| 7,808,009 B2 * | 10/2010 | Hirakata et al. | | 257/83 |
| 7,835,037 B2 * | 11/2010 | Koide | | 358/474 |
| 8,026,518 B2 * | 9/2011 | Kokubo et al. | | 257/59 |
| 8,094,806 B2 * | 1/2012 | Levy | | 379/368 |
| 8,130,198 B2 * | 3/2012 | Tan et al. | | 345/168 |
| 8,154,473 B2 * | 4/2012 | Engel et al. | | 345/4 |
| 8,314,426 B2 * | 11/2012 | Kokubo et al. | | 257/59 |
| 8,670,002 B2 * | 3/2014 | Kim et al. | | 345/658 |
| 2001/0024303 A1 * | 9/2001 | Odhner et al. | | 359/1 |
| 2002/0113866 A1 * | 8/2002 | Taniguchi et al. | | 348/51 |
| 2003/0067539 A1 * | 4/2003 | Doerfel et al. | | 348/51 |
| 2003/0080944 A1 * | 5/2003 | Takahashi et al. | | 345/168 |
| 2003/0114200 A1 * | 6/2003 | Lee | | 455/566 |
| 2003/0160917 A1 * | 8/2003 | Takahashi et al. | | 349/113 |
| 2003/0184829 A1 * | 10/2003 | Odhner et al. | | 359/15 |
| 2004/0032659 A1 * | 2/2004 | Drinkwater | | 359/558 |
| 2004/0035012 A1 * | 2/2004 | Moehnke et al. | | 33/494 |
| 2004/0051445 A1 * | 3/2004 | Adachi | | 313/504 |
| 2004/0090399 A1 * | 5/2004 | Bal-Yona et al. | | 345/76 |
| 2004/0100598 A1 * | 5/2004 | Adachi et al. | | 349/113 |
| 2004/0183746 A1 * | 9/2004 | Tomisawa | | 345/1.1 |
| 2004/0240777 A1 * | 12/2004 | Woodgate et al. | | 385/16 |
| 2005/0023356 A1 * | 2/2005 | Wiklof et al. | | 235/462.42 |
| 2005/0052349 A1 * | 3/2005 | Kuczynski et al. | | 345/49 |
| 2005/0090288 A1 * | 4/2005 | Stohr et al. | | 455/566 |
| 2005/0099411 A1 * | 5/2005 | Van Brocklin et al. | | 345/204 |
| 2005/0153728 A1 * | 7/2005 | Ronkko | | 455/550.1 |
| 2005/0243078 A1 * | 11/2005 | Ozeki et al. | | 345/204 |
| 2005/0264521 A1 * | 12/2005 | Liu et al. | | 345/156 |
| 2005/0270604 A1 * | 12/2005 | Drinkwater | | 359/2 |
| 2006/0001937 A1 * | 1/2006 | Drinkwater | | 359/200 |
| 2006/0012573 A1 * | 1/2006 | Homer et al. | | 345/168 |
| 2006/0025222 A1 * | 2/2006 | Sekine | | 463/42 |
| 2006/0061703 A1 * | 3/2006 | Chen | | 349/58 |
| 2006/0076479 A1 * | 4/2006 | Lim et al. | | 250/229 |
| 2006/0159443 A1 * | 7/2006 | Cho et al. | | 396/287 |
| 2006/0209244 A1 * | 9/2006 | Yanagawa et al. | | 349/153 |
| 2006/0222174 A1 * | 10/2006 | Kang et al. | | 379/433.07 |
| 2006/0238772 A1 * | 10/2006 | Hanson et al. | | 356/484 |
| 2006/0263539 A1 * | 11/2006 | Argoitia | | 427/547 |
| 2006/0268385 A1 * | 11/2006 | Guarr et al. | | 359/265 |
| 2006/0290837 A1 * | 12/2006 | Kawamura et al. | | 349/58 |
| 2007/0001994 A1 * | 1/2007 | Roth | | 345/102 |
| 2007/0030425 A1 * | 2/2007 | Chan | | 349/114 |
| 2007/0058227 A1 * | 3/2007 | Raksha et al. | | 359/2 |
| 2007/0060296 A1 * | 3/2007 | Yoshizawa | | 463/20 |
| 2007/0111750 A1 * | 5/2007 | Stohr et al. | | 455/550.1 |
| 2007/0145136 A1 * | 6/2007 | Wiklof et al. | | 235/454 |
| 2007/0171503 A1 * | 7/2007 | Luo | | 359/237 |
| 2007/0176851 A1 * | 8/2007 | Willey et al. | | 345/32 |
| 2007/0195294 A1 * | 8/2007 | Willey et al. | | 353/119 |
| 2007/0238505 A1 * | 10/2007 | Okada | | 463/16 |
| 2007/0249383 A1 * | 10/2007 | Wiklof et al. | | 455/522 |
| 2007/0258128 A1 * | 11/2007 | Guarr et al. | | 359/265 |
| 2007/0268261 A1 * | 11/2007 | Lipson | | 345/169 |
| 2008/0004102 A1 * | 1/2008 | Kojima | | 463/20 |
| 2008/0007155 A1 * | 1/2008 | Adachi | | 313/498 |
| 2008/0039172 A1 * | 2/2008 | Okada | | 463/17 |
| 2008/0039177 A1 * | 2/2008 | Okada | | 463/20 |
| 2008/0045297 A1 * | 2/2008 | Okada | | 463/17 |
| 2008/0045309 A1 * | 2/2008 | Okada | | 463/20 |
| 2008/0045310 A1 * | 2/2008 | Okada | | 463/20 |
| 2008/0045315 A1 * | 2/2008 | Kojima | | 463/20 |
| 2008/0045316 A1 * | 2/2008 | Kojima | | 463/20 |
| 2008/0051167 A1 * | 2/2008 | Okada | | 463/16 |
| 2008/0055287 A1 * | 3/2008 | Ishikawa et al. | | 345/204 |
| 2008/0058090 A1 * | 3/2008 | Okada | | 463/25 |
| 2008/0074604 A1 * | 3/2008 | Yanagawa et al. | | 349/153 |
| 2008/0084527 A1 * | 4/2008 | Yanagawa et al. | | 349/123 |
| 2008/0100192 A1 * | 5/2008 | Ou-Yang et al. | | 313/113 |
| 2008/0143451 A1 * | 6/2008 | Sprague et al. | | 331/157 |
| 2008/0181082 A1 * | 7/2008 | Bates et al. | | 369/103 |
| 2008/0192158 A1 * | 8/2008 | Yoshihara et al. | | 349/33 |
| 2008/0225223 A1 * | 9/2008 | Yanagawa et al. | | 349/155 |
| 2008/0254843 A1 * | 10/2008 | Maenpaa | | 455/575.3 |
| 2008/0262341 A1 * | 10/2008 | Boyden et al. | | 600/424 |
| 2008/0278662 A1 * | 11/2008 | Moriya | | 349/75 |
| 2009/0033886 A1 * | 2/2009 | Jones | | 353/94 |
| 2009/0066868 A1 * | 3/2009 | Kim et al. | | 349/38 |
| 2009/0072731 A1 * | 3/2009 | Adachi | | 313/504 |
| 2009/0115710 A1 * | 5/2009 | Chevroulet et al. | | 345/87 |

(56) References Cited

U.S. PATENT DOCUMENTS

| | | | |
|---|---|---|---|
| 2009/0134319 A1* | 5/2009 | Sprague et al. | 250/234 |
| 2009/0141379 A1* | 6/2009 | Choi et al. | 359/865 |
| 2009/0168165 A1* | 7/2009 | Hoffman | 359/463 |
| 2009/0310044 A1* | 12/2009 | Lee | 349/15 |
| 2010/0103206 A1* | 4/2010 | Kamada et al. | 345/690 |
| 2010/0214311 A1* | 8/2010 | Roth | 345/590 |
| 2010/0214524 A1* | 8/2010 | Yanagawa et al. | 349/156 |
| 2011/0143836 A1* | 6/2011 | Allitt et al. | 463/31 |
| 2011/0163333 A1* | 7/2011 | Adachi | 257/88 |
| 2011/0292350 A1* | 12/2011 | Kasazumi et al. | 353/31 |
| 2012/0120361 A1* | 5/2012 | Yanagawa et al. | 349/139 |
| 2012/0307182 A1* | 12/2012 | Bell et al. | 349/69 |

FOREIGN PATENT DOCUMENTS

| | | | | |
|---|---|---|---|---|
| EP | 1 280 319 A2 | | 1/2003 | |
| JP | 10-187332 A | * | 12/1996 | G06F 3/03 |
| JP | 10-187332 A | * | 7/1998 | G06F 3/03 |
| WO | WO 96/10208 | * | 3/1995 | G02B 27/26 |
| WO | WO 03/079175 | | 9/2003 | |

OTHER PUBLICATIONS

Ask-Search-q=what+is+an+electrochromic+layer&qsrc=0.*
Ask-search-qsrc=1 &o=0&l=dir&q=what+is+an+electrochr.*
http-students.chem.tue.nl-ifp10-project-electro-htm.*
WO-9610208-6-10-2012.*
Yu-etal-WO-2004049047-a1-6-8-2012.*
Ask-Search-q=what+is+an+electrochromic+layer&qsrc=0 Jun. 8, 2012.*
Ask-search-qsrc=1&o=0&l=dir&q=what+is+an+electrochr Jun. 8, 2012.*
Ask-Search-q=light+scattering+liquid+crystal&qsrc=0 Jun. 9, 2012.*
Bing search q=toggle+holographic+keyboard+emboss Sep. 26, 2014.*
Bing search q=toggle+holographic+keyboard&qs=n&f Sep. 26, 2014.*
Bing search q=toggle+holographic+keyboard+rotate Sep. 26, 2014.*
http-students.chem.tue.nl-ifp10-project-electro-htm, no date provided.*
International Search Report for corresponding International Patent Application No. PCT/IL2007/000819 mailed Nov. 14, 2007.

* cited by examiner

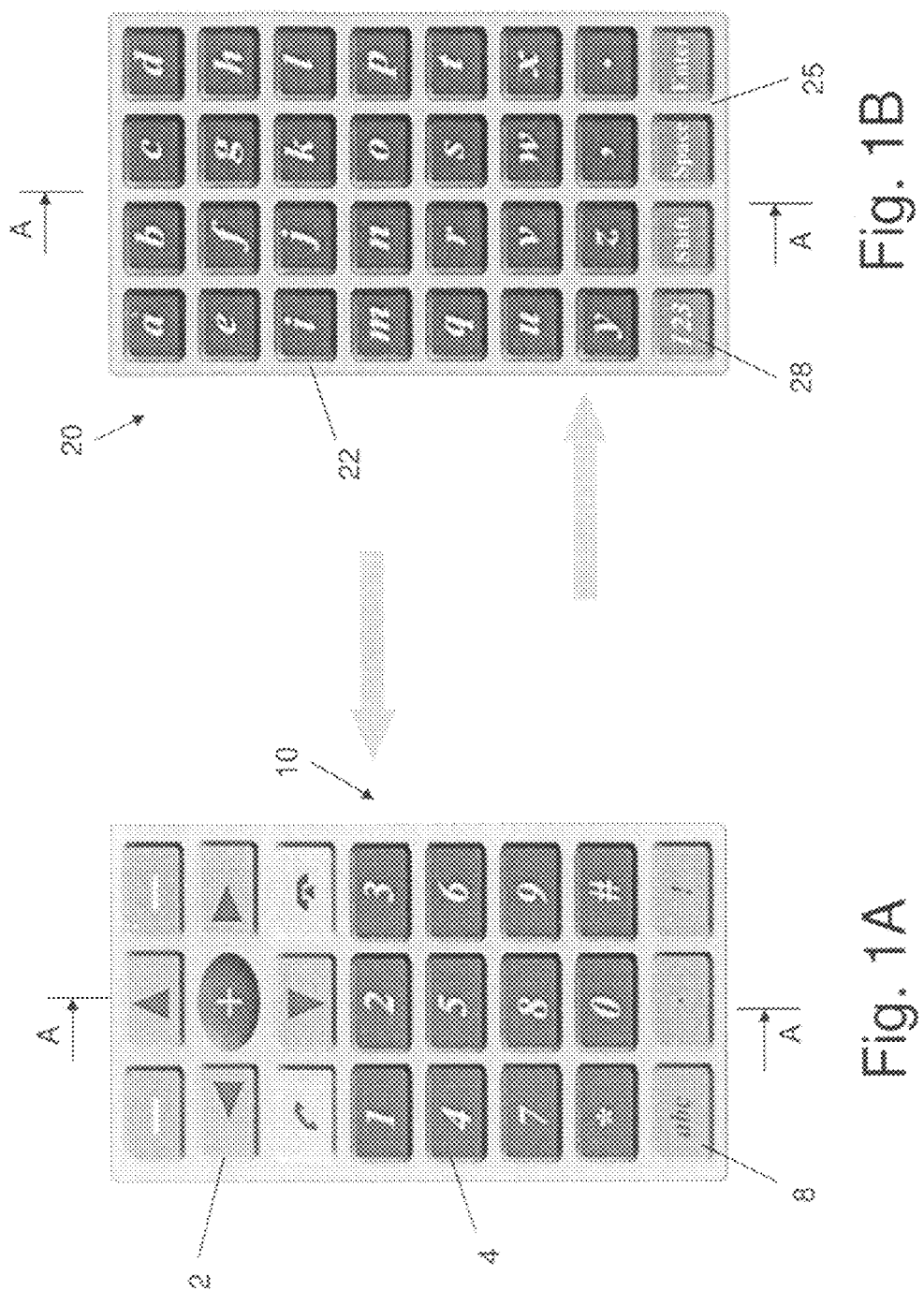

VARIABLY DISPLAYABLE MOBILE DEVICE KEYBOARD

FIELD OF THE INVENTION

The present invention relates to the field of alphanumeric input devices. More particularly, the invention relates to an input device having a variably displayable keyboard.

BACKGROUND OF THE INVENTION

Mobile devices operable in various wireless networks, such as a cellular phone and a personal digital assistant (PDA), are being provided with a larger memory, a stronger and faster processor, smaller size, and with an increasing number of data services that can be performed thereby, such as messaging, e-mail transmission, and gaming.

The computing power of mobile devices is steadily increasing. PDAs are being replaced by smart mobile phones and many analysts predict that in the near future, smart mobile devices will perform many of the functions currently performed by laptop computers. Such a transition has been spurred by stronger and faster central processing units, larger memory, more sophisticated and capable operating systems, new generations of wireless network infrastructures including UMTS/HSDPA and EV-DO WiFi/WiMax, and an increasing penetration rate of data services such as messaging, e-mail, and gaming, despite restrictions of mobility, namely size, weight and battery life.

The size of mobile devices will continue to be limited by the size of the human palm. Thus the majority of mobile devices use the traditional phone keypad, which is inadequate for new smart mobile devices and the corresponding applications. A more efficient alphanumeric input would therefore be desirable.

As the keys, which are pressed during the performance of data services, are becoming smaller in size, the writing of textual messages therewith is becoming a more time consuming process. Due to their small size, each character is not readily visible. Alternatively, if the keys are configured such that each character is visible, the keyboard size is excessively large. Also, the needed time for writing a textual message is increased with respect to interactive instant messaging whereby participants view an accumulative record of a discussion and a display of a message as it is being written in real-time. Since a numeral and a plurality of letters generally appear on each of the prior art keys, three or more clicking operations are needed to select which character appearing on the key is desired to be entered into the text. A delay in entering a character during a clicking operation is interpreted as the completion of the previous character selection, and a subsequent click will display an additional character, which may need to be erased if the delay in clicking was excessive. Due to these disadvantages, the use of a mobile device keypad has generally been limited to the transmission of Short Message Service (SMS) messages.

U.S. Pat. No. 6,805,506 discloses a keypad with multiple indicia sets by which the composite interlaced image is varied for each separate key by tilting the device. Each separate key of the keypad in this patent suffers from the drawback that the composite image consists of a plurality of images which are fixed both in size and relative location. Consequently, a new array of keys or a different surface area of a key is not possible. Due to the orientation of the tilted device, an image may not be comfortably viewed, or alternatively, if the image is comfortably viewed, the resolution thereof will be compromised, particularly when entering textual characters.

It is an object of the present invention to provide a variably displayable mobile device keyboard.

It is an additional object of the present invention to provide a variably displayable keyboard in which, for example, all keys display letters in one mode and in another mode, all keys display numerals.

It is an additional object of the present invention to provide a variably displayable keyboard in which the displayed surface area of the keys can be changed.

It is an additional object of the present invention to provide a keyboard display which displays a stable image of key arrangement.

It is an additional object of the present invention to provide a keyboard display that is an integral part of the mobile device.

It is yet an additional object of the present invention to provide a keyboard with low power consumption.

It is yet an additional object of the present invention to provide a keyboard of relatively low cost.

It is yet an additional object of the present invention to provide a keyboard that does not add to the size or weight of the mobile device.

It is yet an additional object of the present invention to provide a keyboard that may be comfortably viewed.

It is yet an additional object of the present invention to provide a fashionable variably displayable key or keyboard display configuration, the shape and color of which will not restrict look design.

Other objects and advantages of the invention will become apparent as the description proceeds.

SUMMARY OF THE INVENTION

The present invention provides a variably displayable mobile device keyboard, comprising means for presenting two or more groups of basic images, wherein a different keyboard display can be generated by means of each of said groups of basic images; filter means transparent to ambient light for filtering one or more groups of basic images so that a single group of basic images will be displayed; and touch screen means transparent to ambient light for selecting a key of said displayed single group of basic images.

Preferably, the filter means is adapted to vary the keyboard display while a mobile device rear face remains in substantially the same plane In one aspect, the means for presenting two or more groups of basic images consists of a first basic image by which a first keyboard display for displaying an alphabetic display exclusively can be generated and a second basic image by which a second keyboard display for displaying a numeric display exclusively can be generated.

In one aspect, the means for presenting two or more groups of basic images preferably consists of a first basic image by which a first keyboard display for displaying a numeric display exclusively can be generated and a second basic image by which a second keyboard display for displaying an alphanumeric display can be generated.

In one aspect, the means for presenting two or more groups of basic images preferably consists of a first basic image by which a first keyboard display for displaying a numeric display exclusively can be generated and a second basic image by which a second keyboard display for displaying game functions exclusively can be generated.

In one aspect, the shape or color of a key generated by the first basic image is different from that generated by the second basic image.

In one embodiment of the invention, the means for presenting the two or more groups of basic images is an indicia carrier. The two or more groups of basic images are two or more interlaced basic images. The first and second keyboard displays preferably comprise function keys and a key for toggling from a first to a second mode of operation.

In one aspect, the filter means is an optical filter. The optical filter comprises an Liquid Crystal (LC) layer and interlaced strips of electrode strip sets, strips of each of the sets overlying strips of a corresponding underlying basic image, the opacity of the LC regions underlying the electrode strips are adapted to increase in response to a corresponding excitation voltage that changes the polarization of the underlying LC regions, to optically filter the corresponding underlying basic image.

In another aspect, the filter means is a mechanical filter.

In another embodiment of the invention, the means for projecting two or more groups of basic images consists of two orthogonal hologram groups arranged such that the first keyboard display can be toggled to the second keyboard display or vice versa by rotating a mobile device housing the keyboard approximately 90 degrees while a mobile device rear face remains in substantially the same plane. Each hologram is a surface relief pattern embossed in a plastic film and is adapted to project a unique display of the array of keys.

In another embodiment of the invention the means for projecting two or more groups of basic images consists of two or more spectrally separated illuminators and two or more interlaced or overlaid images, each printed in its own color, such that the spectral response of each color image is essentially zero for the illuminators of other colors.

BRIEF DESCRIPTION OF THE DRAWINGS

In the drawings:

FIGS. 1A and 1B are a front view of two distinct displays, respectively, of an exemplary keyboard of the present invention, showing the variation in surface area of a keys array between the two displays;

DETAILED DESCRIPTION OF PREFERRED EMBODIMENTS

The present invention is a novel keyboard integral with a mobile device that can be toggled from one mode to another.

While the surface area of a prior art key is constant and unchangeable, the surface area of the array of keys of the present invention can be toggled between different groups of images. By doing so, the surface area of the keyboard can be optimally utilized. That is, the exploited area dedicated for input keys is doubled (for toggling between two displays) or tripled (for toggling between three displays). In addition, a keyboard region between keys that is not in use in one mode can be encompassed within the outline of a data transmitting key in another mode.

The two keyboard modes can be user selected. A first mode may be one in which all keys display letters exclusively and a second mode may be one in which all keys display numerals exclusively. Similarly, a first mode may be one in which all keys display numerals exclusively and a second mode may be an alphanumeric display in which some keys display letters and some keys display numerals. Likewise, a first mode may be one in which all keys display numerals exclusively and a second mode may be one in which all keys display game functions exclusively. It will be appreciated that three modes may be employed, although there may be a reduction in the resolution of a key.

The appearance (shape, texture and color) of the keys in a given mode provides full freedom of look design to a designer of the device (which is a consumer product). Each key may have the same or a different configuration. Likewise the background which appears between two keys in a given mode can be adapted to the desired design. As a result, the key or keyboard display configuration that appears may provide a fashionable variable display which is appealing to female and teenage users.

In one embodiment of the invention, the adjustability of the keyboard display is made possible by virtue of an interlaced image and a filter, combined with a touch screen. The filter is operable to change the keyboard display associated with a selected mode of operation. In each mode, a given region of the touch screen is associated with a unique character.

FIGS. 1A and 1B illustrate a front view of two displays, respectively, of an exemplary keyboard of the present invention. The keyboard is shown to be rectangular, and any other shape or configuration is equally suitable. Each of the two displays is a basic image of a composite interlaced image. A basic image is printed on a plurality of equally spaced strips.

Figure 1C:
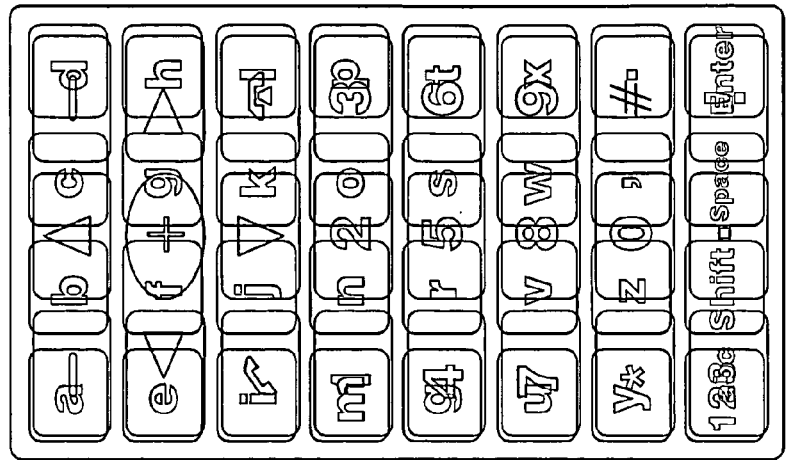
FIGS. 1C and 1D illustrate two basic images that are arranged such that a strip of a first basic image is interposed between two strips of a second basic image.
Figure 1D:
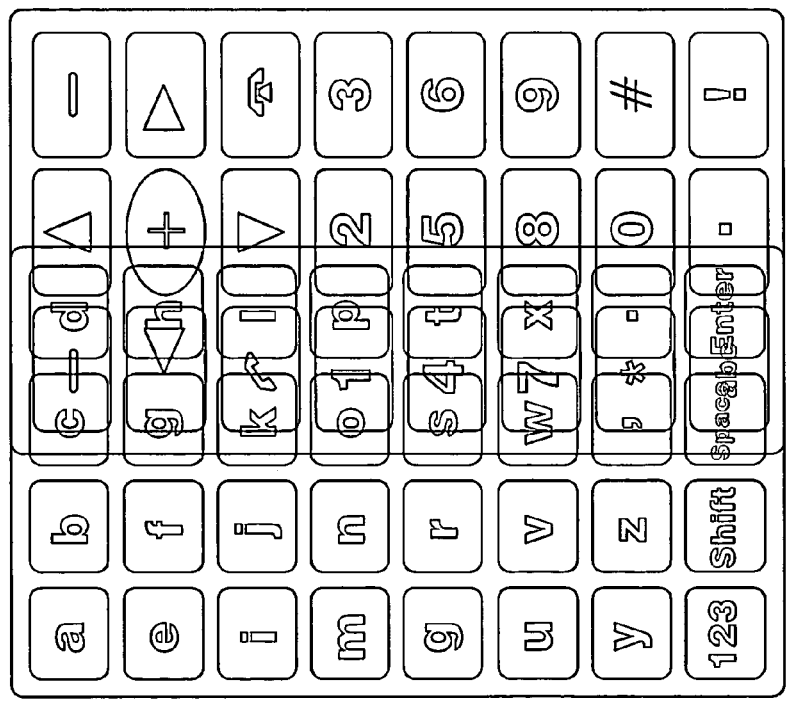

FIGS. 1C and 1D illustrate two basic images that are arranged such that a strip of a first basic image is interposed between two strips of a second basic image. The two basic images are then interlaced in a fashion well known to those skilled in the art to form an indicia carrier. FIG. 1C illustrates a partial overlap of the interlaced area. FIG. 1D illustrates a complete overlap of the interlaced area.

A first keyboard display appears on the front protective layer of the keyboard when the first basic image is visible, and a second display appears on the front protective layer of the keyboard when the second basic image is visible. A filter, which will be described hereinafter, selectively controls which basic image will be visible.

It will be appreciated that the indicia carrier may be comprised of three interlaced basic images, although the resolution of the display may be less than an indicia carrier comprised of two interlaced basic images.

Display 10 shown in FIG. 1A is a numeric display having an array of 24 keys arranged in three columns, wherein region 2 consisting of the top nine keys are function keys, region 4 consists of a key for each of the 10 digits, the asterisk key, the pound key, the period key, and the exclamation mark key, and the mode key 8 for toggling the display to a display of letters.

Display 20 shown in FIG. 1B is a display of letters having an array of 32 keys arranged in four columns, wherein region 22 consists of keys for the 26 letters of the alphabet, a comma key, and a period key, the mode key 28 for toggling from letters to a numeral display, and region 25 consisting of function keys.

Display 10 and display 20 have the same surface area, yet each key of display 20 is narrower than each key of display 10, so that the keyboard image of display 20 has 4 columns and that of display 10 has 3 columns. Although the keyboards of display 10 and 20 are differently arranged, each key is adapted to transmit a different signal to the microprocessor of the mobile device when pressed, to help define a data service to be performed. A touch screen is used to transmit a discrete predetermined voltage to the microprocessor as a key of the selected keyboard is pressed.

Figure 2:
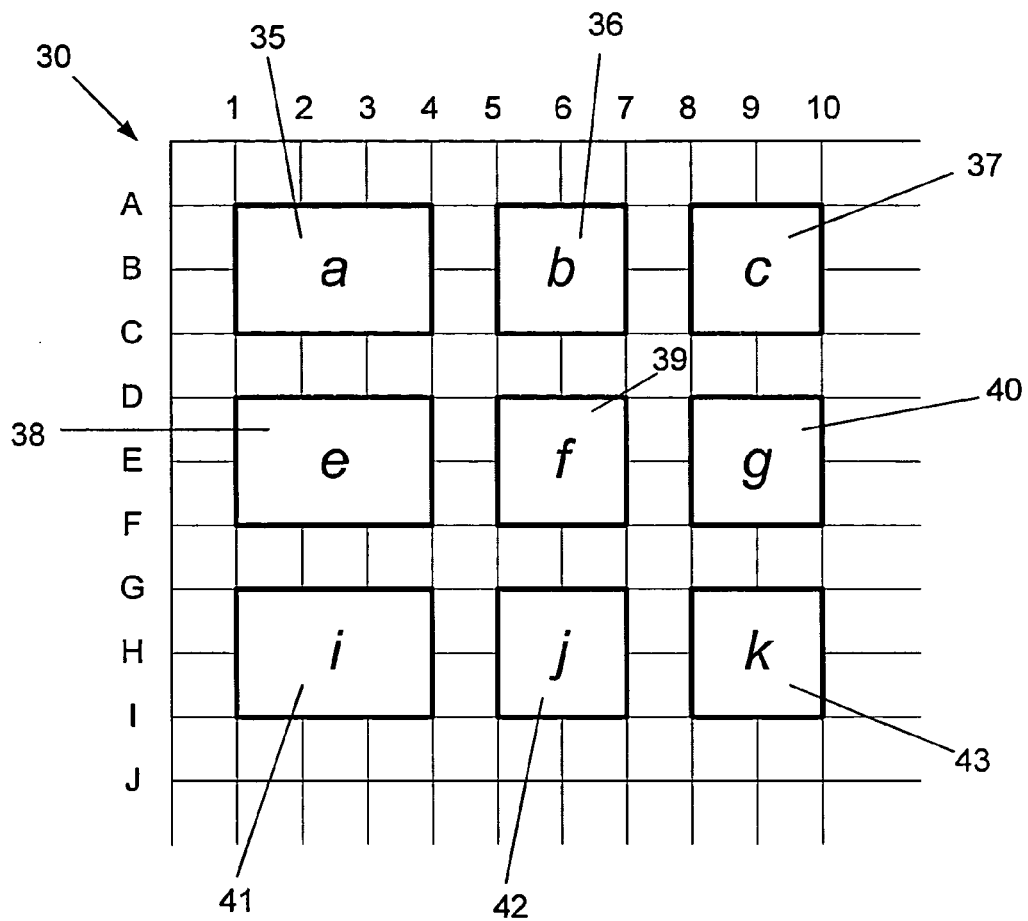
FIG. 2 schematically illustrates a plurality of touch regions by which information is entered in one mode of operation.

A touch screen in an input device which is well known to those skilled in the art. FIG. 2 schematically illustrates a portion of touch screen 30, to illustrate how a key which has been pressed can be identified. Touch screen 30 is provided with a grid of x-y coordinates, such as by means of electrodes or any other suitable means well known to those skilled in the art, to identify a region thereof that has been pressed. The coordinates of the illustrated touch screen portion are represented by x-coordinates 1-10 and by y-coordinates A-J. Touch regions 35-43 corresponding to nine keys of display 20 of FIG. 1B, respectively, are shown in respect to the grid. The touch regions for the letter mode are defined by the corresponding coordinates and are stored in the microprocessor. For example, letter b is delimited by the region defined by coordinates 5A, 7A, 5C and 7C. When an area within this region is pressed, a voltage indicative of the region is transmitted to the microprocessor, and the latter then transmits a signal to a data application which corresponds to the letter b.

When an intermediate area between or bordering two key regions is pressed, an uncertainty arises as to which key region has been pressed. The microprocessor is provided with a software application that determines the highest probability of which key region has been desired to be pressed. For example, if an area between 4B and 5B has been pressed, the microprocessor is uncertain as to whether key region a or key region b has been pressed. The software application is generally based on other factors which help to decide which key the user actually intended to activate. In addition, whenever a key is depressed and identified properly, an audible indication is provided to the user, so as to notify him that his input has been concretely received.

Figure 3:
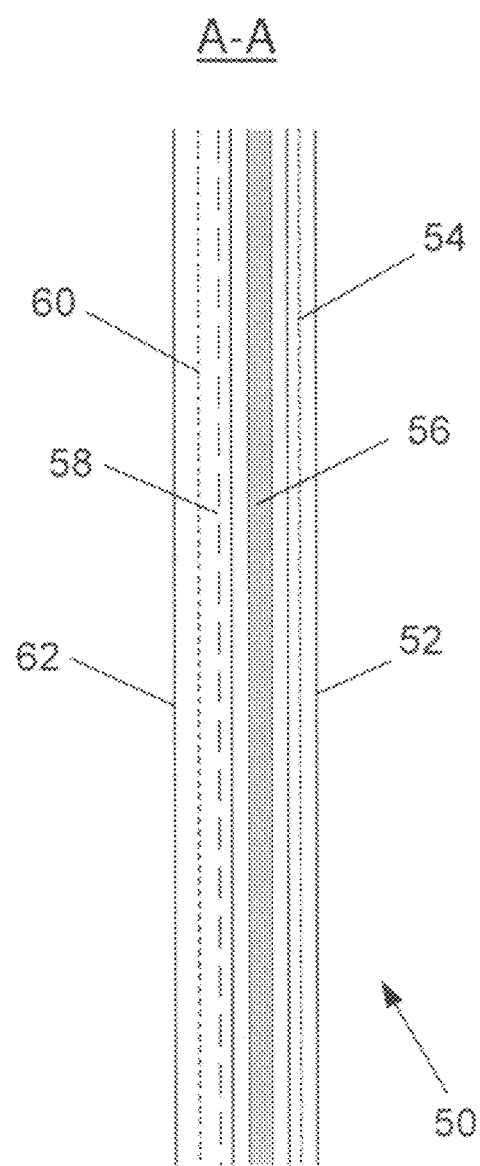
FIG. 3 is a vertical cross section of the keyboard of FIGS. 1A and 1B, illustrating only the layers which produce the variable display.

FIG. 3 illustrates a cross section of a mobile device keyboard, which is generally indicated by numeral 50, according to one embodiment of the invention. Only the layers which produce the variable display are illustrated, and it will be appreciated that one or more layers constituting the touch screen apparatus are also provided. As shown, keyboard 50 comprises the following layers: front protective layer 52, e.g. a polyester film, layer 54 below front protective layer 52 e.g., in the form of two sets of thin interlaced electrodes, LC layer 56 below layer 54, backside electrode 58 below liquid crystal layer 56, indicia carrier 60 below backside electrode 58 in which the first basic image of a numeric display is interlaced with the second basic image of an alphabetic display, and backlight layer 62 below indicia carrier 60. Front protective layer 52, layer 54, liquid crystal layer 56, backside electrode 58, indicia carrier 60 (above or below), and backlight layer 62 are all transparent to ambient light (In this case layers 54, 56 and 58 form the filter). Alternatively, a different order of some of the layers can be used, according to the actual implementation.

Each set of electrodes in layer 54 is arranged in the form of a plurality of equally spaced strips, such that the strips of a first set of electrodes essentially overlie the strips of the first basic image of indicia carrier 60 and that the strips of a second set of electrodes essentially overlie the strips of the second basic image.

Figure 4:
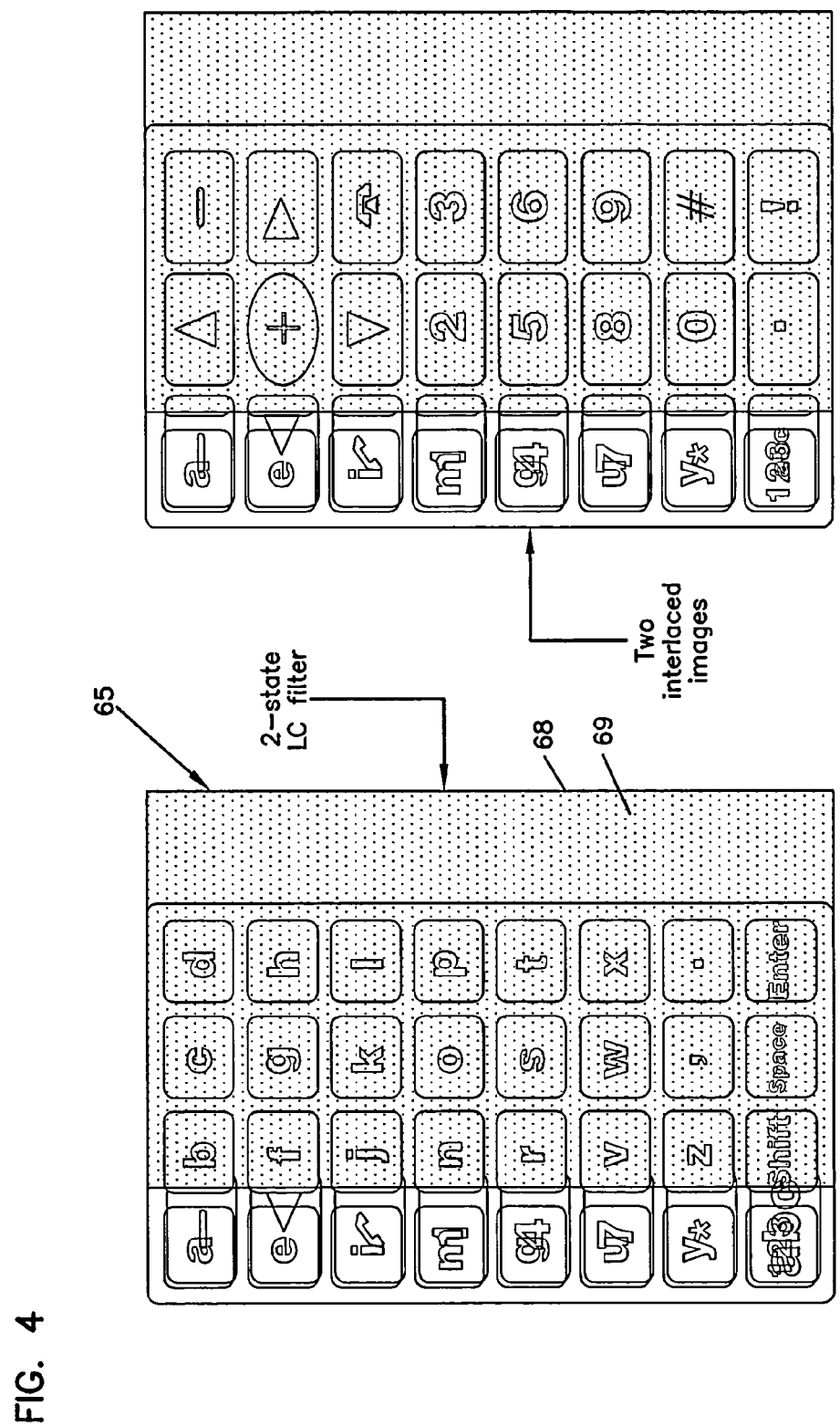
FIG. 4 schematically illustrates an optical filter, which is in an offset position, for clarification.

As schematically illustrated in FIG. 4, the filter may be an optical filter 65. Optical filter 65 comprises alternating transparent strips of first and second sets of electrodes 68 and 69. The opacity of the LC regions underlying the transparent electrode strips rapidly changes from a transparent mode to an opaque mode and vise versa, in response to a first and second excitation voltage, respectively. Following the generation of the excitation voltage, the opacity of the corresponding LC regions underlying the electrode strips increases, and an electrical circuit is formed between the set of electrodes of the layer and a corresponding set of electrodes of the backside electrode layer after corresponding portions of liquid crystal layer become polarized. Thus the first basic image is opaque and only the second basic image is visible.

Figure 5:
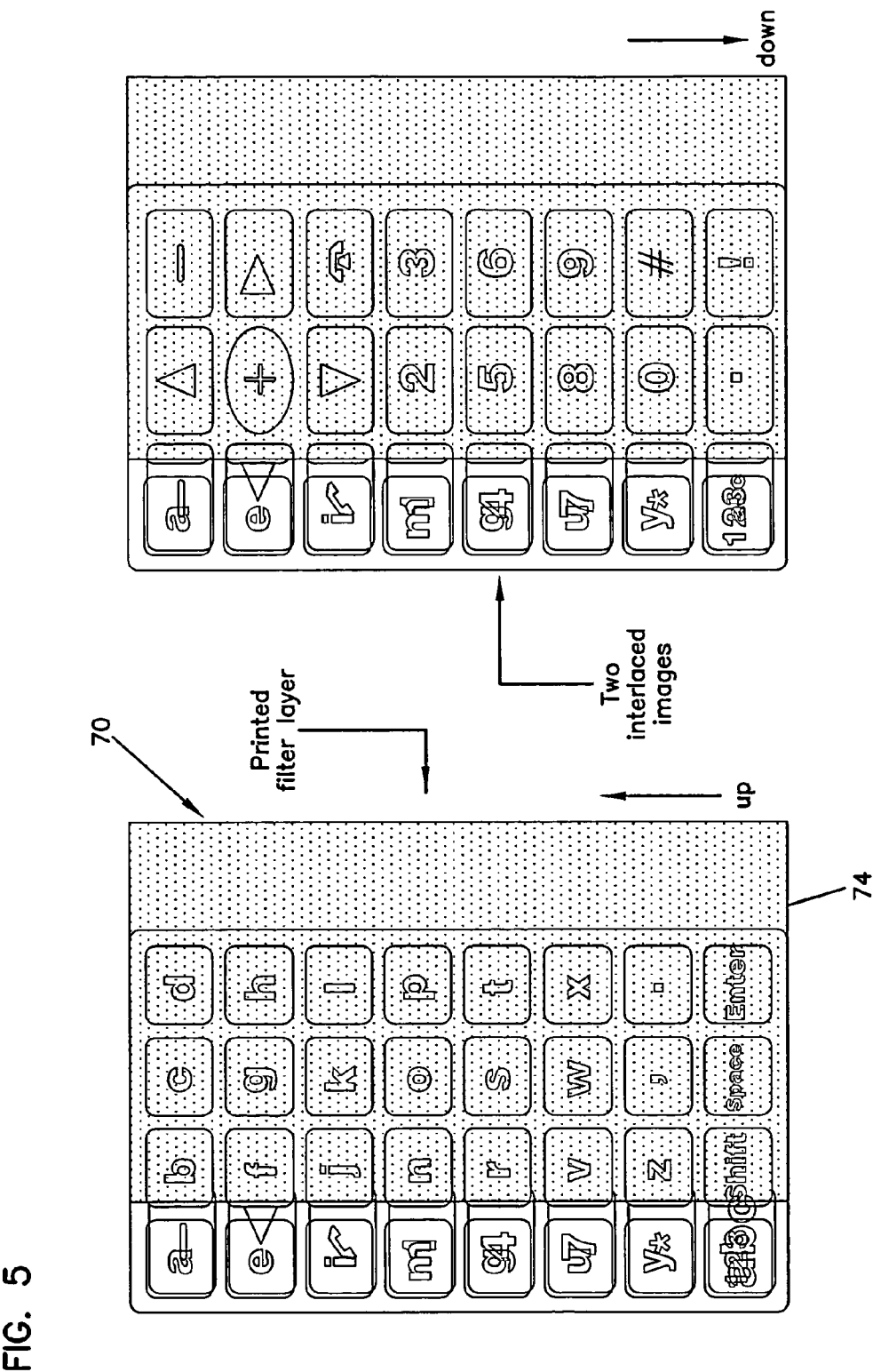
FIG. 5 schematically illustrates a mechanical filter, which is in an offset position, for clarification.

As schematically illustrated in FIG. 5, the filter may be a mechanical filter 70. Mechanical filter 70 comprises an array 74 of equally spaced strips, each of which having a width essentially equal to that of the strips of the first and second basic images. As filter 70 is displaced in one of two directions, the displacement being limited to the width of a strip of the first and second basic images by means well known to those skilled in the art (e.g., a miniature piezoelectric element with linear movement, or other electro mechanical or electro magnetic device), array 74 covers the strips of the first basic image so that the second basic image will be displayed. Similarly, when filter 70 is displaced in the other direction, array 74 covers the strips of the second basic image so that the first basic image will be displayed.

In another embodiment of the invention, the keyboard display is generated by means of one of two orthogonal holograms located behind the touch screen, wherein the display is toggled by rotating the mobile device approximately 90 degrees while its rear face remains in the same plane so that a single hologram will be visible.

The two holograms are colored holograms, which are formed as surface relief patterns embossed in a plastic film. Each hologram is produced in such a way as to be viewable. The holograms are embossed such that a first basic image corresponding to an alphabetic display is visible at a first orientation of the mobile device and that a second basic image corresponding to a numeric display is visible at a second orientation of the mobile device. Each hologram corresponds to a given region of the touch screen and is therefore associated with a character, following selection of a desired mode. The technical considerations and design of such orthogonal holograms, as well as the design of desired separation between toggled images, should be well known in the art of holograms and are not described in the specification, for the sake of brevity. The holograms for each of the two displays may be printed on the same layer.

Figure 6B:
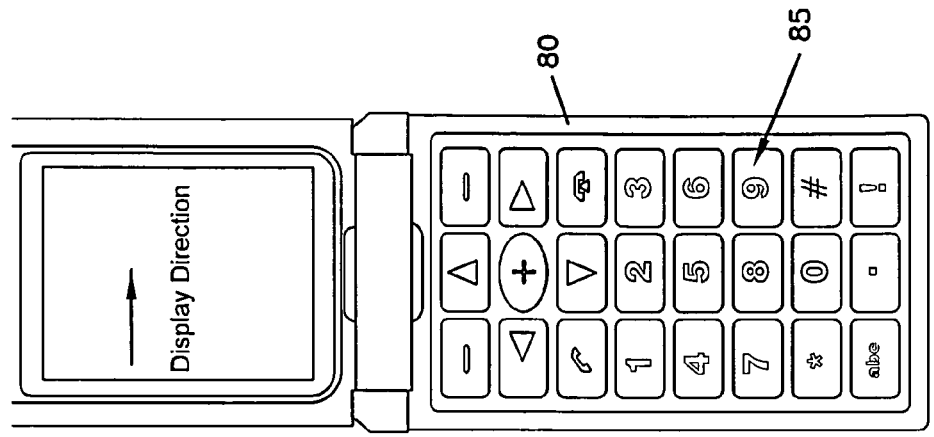
FIGS. 6A and 6B illustrate two different displays generated by orthogonal holograms.
Figure 6A:
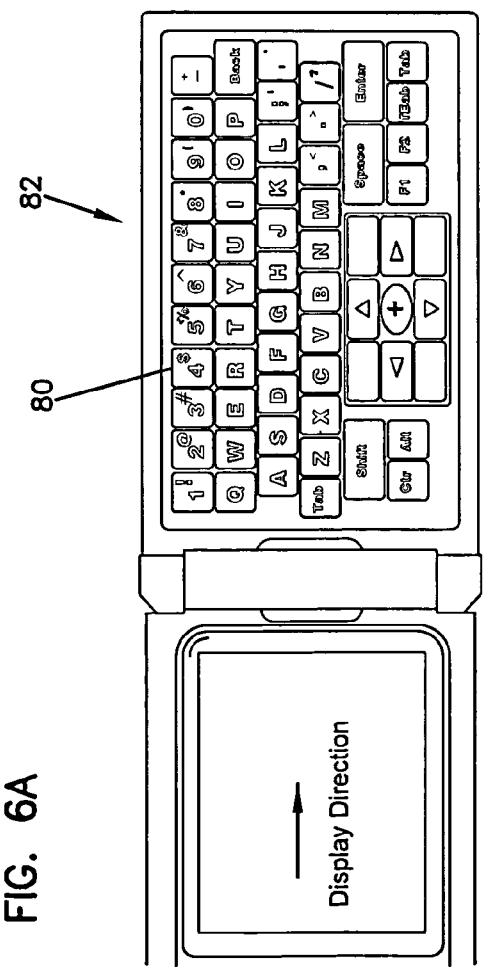

FIG. 6A illustrates mobile device 80 in one orientation such that alphabetic display 82 is visible. When mobile device 80 is rotated approximately 90 degrees, as shown in FIG. 6B, numeric display 85 is visible. By not having to tilt the mobile device, the resolution of, and the comfort of viewing, the display generated by the present invention is substantially increased.

In yet another embodiment of the invention, the alternating keyboard display is generated by means of printing two or more interlaced or overlaid images in different colors and backlighting them with spectrally separated illuminators, such that each color image is responsive only to its spectrally matching illuminator.

Figure 7:
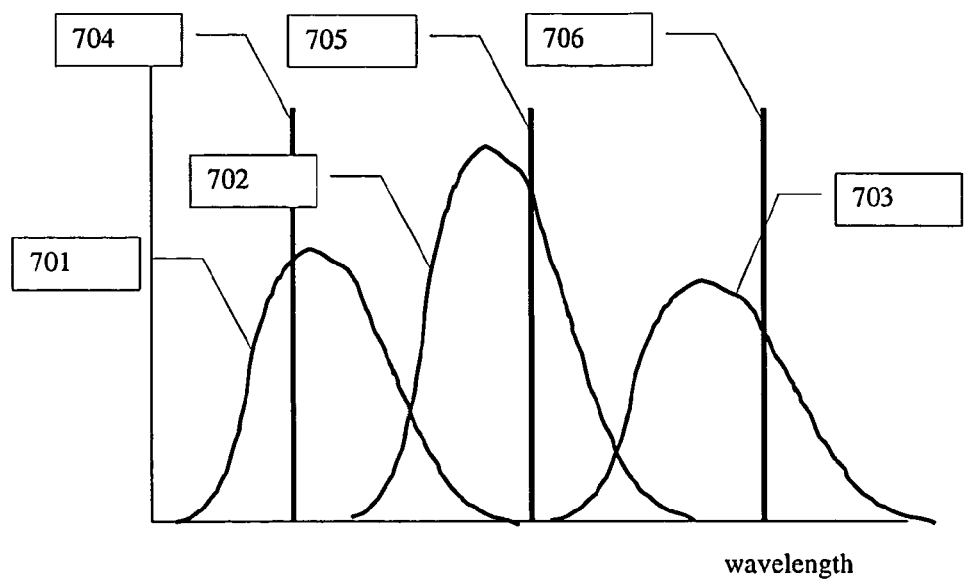
FIG. 7 schematically illustrates the principle of spectral separation of the overlaid color images.

The principle of spectral separation is illustrated in FIG. 7. In this figure, 701, 702, and 703 are the spectral responsivity curves of three color filters (partially overlapping), and 704, 705, and 706 are the narrow-band emission curves of three color illuminators. Clearly, the light from the illuminator 704 can be transmitted (or reflected) only by the color filter 701, so that when the illuminator 704 is switched on, only the color image printed in color 701 will be visible. Equally, with the illuminator 705, only the image printed in color 702 will be visible, and with the illuminator 706 only the image printed in color 706 will be visible. The spectral separation in FIG. 7 is illustrated for very narrow band sources, but it is clear that wider-band sources can also be chosen provided that the spectral emission of each source is transmitted or reflected by only one color filter.

Figure 8:
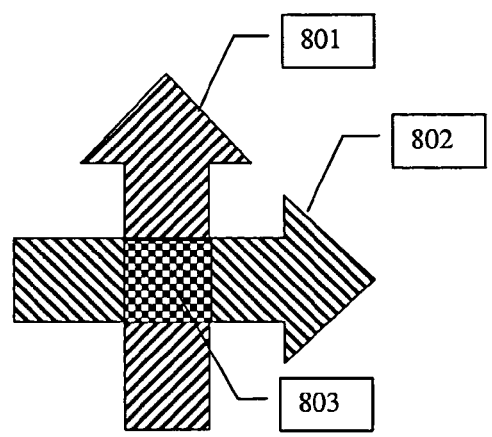
FIG. 8 illustrates an embodiment of the spectral image separation.

The images displayed by the alternating keyboard display based on the principle of spectral separation can be printed in an interlaced mode, where each image line is printed in a different color, so that when a given illuminator is switched on, only the lines of the corresponding color are visible. Alternatively, the images can be printed in an overlay mode (as shown in FIG. 8), where each image is printed fully in its color without interlacing, except for the regions of intersection. In FIG. 8, 801 is an unambiguous region of the first image, which is printed fully in the first color; 802 is an unambiguous region of the second image printed fully in the second color; and 803 is the region of intersection of the two images which is printed as a color mosaic with neighboring pixels having alternating colors, so that this region will be visible under either illumination (although at half the intensity). The advantage of the overlay method over interlacing is that the unambiguous regions are fully transmissive (or reflective), whereas in the interlaced mode only a part of the image surface is operational (half for two colors). As a result, this method is more economical from the power consumption point of view.

Figure 9:
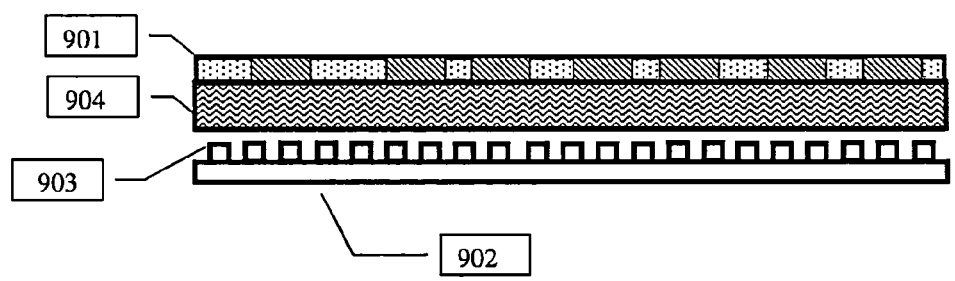
FIG. 9 illustrates an embodiment where the spectral separation works in transmission, with a single plane illuminator underlying an overlaid color image containing two or more images.

In the preferred embodiment, the spectral separation works in transmission, with a single plane illuminator underlying an overlaid color image containing two or more images, each printed in its own transparent color ink. The plane illuminator is coupled to two or more appropriate narrow-band light sources, such as LEDs or laser diodes of different colors, chosen in accordance with the spectral separation principle. This embodiment is illustrated in FIG. 9, where 901 is a thin transparent plate or film printed with two (or more) images of different colors and 902 is a spectral illuminator capable of producing light in two or more appropriate narrow spectral bands. The spectral illuminator 902 comprises an interlaced array of small emitters 903 of the required colors, such as surface-mount LEDs, and a milky-glass plate 904, with the plate serving to smooth the discreteness of the individual small emitters 903.

Whereas in the preferred embodiment shown in FIG. 9 the light emitters are light-emitting diodes (LEDs), the invention is not limited to them and other light sources satisfying the spectral separation principle can be used, such as laser diodes, spectrally filtered wide-band sources, fiber-coupled sources or any other light source known in art.

The spectral separation principle is applicable not only in transmission (back-lighting) as shown in FIG. 9, but also in reflection where the color images are printed using reflective ink on an opaque surface and the spectrally selective illuminator provides front lighting.

The images selected on the basis of the spectral separation principle are each produced in its own color. If so desired, it is possible to produce them all in the same color or color band by covering the color images 901 by a fluorescent layer excitable by any of the spectral illuminators 903. As a result, the selected image will always appear in the same color defined by the fluorescent layer.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A mobile device for generating a variably displayable keyboard, comprising:
   a memory device in which instructions are stored for generating two or more groups of basic images, wherein a different keyboard display is generated by each of said groups of basic images so that a surface area of a key generated by a first group of basic images is different from a surface area generated by a second group of basic images;
   one or more holographic units for presenting each of said two or more groups of basic images;
   touch screen means transparent to ambient light by which a key of said displayed single group of basic images is selectable and is able to generate an input signal, said touch screen means comprising toggling means for toggling between different keyboard displays; and
   a microprocessor receiving from said toggling means an activation signal which is indicative of a selected group of basic images, said microprocessor retrieving from said memory device instructions corresponding to said selected group; wherein in response to said retrieved instructions, said microprocessor transmitting data for displaying said selected group of basic images by said one or more hologram projecting units; and said microprocessor receiving said input signal;
   wherein said transmitted data is indicative of a command for optimally utilizing a surface area of the keyboard display corresponding to the selected group with respect to a mobile device type and key allocation constraints of said selected group, while maximizing a displayed key size;
   wherein first and second keyboard displays have a same surface area although the surface area of one or more keys is different in the first display than in the second display.

2. The mobile device according to claim 1, wherein the first group of basic images includes an alphabetic display exclusively and the second group of basic images includes a numeric display exclusively.

3. The mobile device according to claim 2, wherein a shape or color generated by the first group of basic images is different from a shape or color generated by the second group of basic images.

4. The mobile device according to claim 2, wherein the first and second groups of basic images include function keys.

5. The mobile device according to claim 1, wherein the one or more hologram projecting units consists of two orthogonal hologram projecting units arranged such that the first keyboard display can be toggled to the second keyboard display or vice versa by rotating a mobile device housing approximately 90 degrees while a mobile device rear face remains in substantially the same plane.

6. The mobile device according to claim 1, wherein each hologram projecting unit operates with a surface relief pattern embossed in a plastic film which is adapted to project a unique display.

7. The mobile device according to claim 1, wherein the first group of basic images includes a numeric display exclusively and the second group of basic images includes a game function display exclusively.

8. The mobile device according to claim 7, wherein the shape or color of a key generated by the first group of basic images is different from that generated by the second group of basic images.

9. The mobile device according to claim 7, wherein the first and second groups of basic images include function keys.

10. The mobile device according to claim 1, wherein the microprocessor is provided with a software application that determines a highest probability of which key region has been desired to be pressed.

11. A mobile device for generating a variably displayable keyboard, comprising:
   a) a memory device in which are stored instructions for generating two or more groups of basic images, wherein a different keyboard display is generated by means of each of said groups of basic images such that a relative arrangement of keys generated by a first group of basic images is different from that generated by a second group of basic images;
   b) one or more hologram projecting units for presenting each of said two or more groups of basic images;
   c) touch screen means transparent to ambient light by which a key of said displayed single group of basic images is selectable and is able to generate an input signal, said touch screen means further comprising toggling means for toggling between different keyboard displays; and
   d) a microprocessor receiving from said toggling means an activation signal which is indicative of a selected group of basic images, said microprocessor retrieving from said memory device instructions corresponding to said selected group; wherein in response to said retrieved instructions, said microprocessor transmitting data for displaying said selected group of basic images by said one or more hologram projecting units; and said microprocessor receiving said input signal,
   wherein said transmitted data is indicative of a command for optimally utilizing a surface area of the keyboard display corresponding to the selected group with respect to a mobile device type and key allocation constraints of said selected group, while maximizing a displayed key size,
   wherein first and second keyboard displays have the same surface area even though the relative arrangement of keys is different in the first display than in the second display.

* * * * *